(12) United States Patent
Smith et al.

(10) Patent No.: US 8,649,121 B1
(45) Date of Patent: Feb. 11, 2014

(54) DISK DRIVE TUNING SPEED CONTROL LOOP FOR A SPINDLE MOTOR

(75) Inventors: Brandon P. Smith, San Jose, CA (US); Wenli Yang, Los Angeles, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/433,142

(22) Filed: Mar. 28, 2012

(51) Int. Cl.
G11B 5/00 (2006.01)

(52) U.S. Cl.
USPC ..................... 360/73.01; 360/73.08

(58) Field of Classification Search
USPC ............... 369/44.29, 47.25, 53.43, 189, 239; 360/73.01, 73.08, 73.09, 39, 55, 73.03
See application file for complete search history.

(56) References Cited

U.S. PATENT DOCUMENTS

| | | | |
|---|---|---|---|
| 5,170,386 A | 12/1992 | Tateishi | |
| 5,404,255 A * | 4/1995 | Kobayashi et al. | 360/78.09 |
| 5,432,766 A | 7/1995 | Ando et al. | |
| 5,471,353 A | 11/1995 | Codilian et al. | |
| 5,898,283 A | 4/1999 | Bennett | |
| 6,574,062 B1 | 6/2003 | Bennett et al. | |
| 6,753,667 B2 | 6/2004 | Sakamoto | |
| 6,825,622 B1 | 11/2004 | Ryan et al. | |
| 6,914,740 B1 | 7/2005 | Tu et al. | |
| 6,954,324 B1 | 10/2005 | Tu et al. | |
| 6,965,547 B2 * | 11/2005 | Kadlec et al. | 369/44.29 |
| 6,972,540 B1 | 12/2005 | Wang et al. | |
| 7,265,936 B1 | 9/2007 | Lee et al. | |
| 7,289,288 B1 | 10/2007 | Tu | |
| 7,443,628 B2 | 10/2008 | Oyabu | |
| 7,471,483 B1 | 12/2008 | Ferris et al. | |
| 7,602,129 B2 | 10/2009 | Shirai et al. | |
| 2002/0110057 A1 * | 8/2002 | Kadlec et al. | 369/44.29 |
| 2004/0013056 A1 * | 1/2004 | Ando | 369/44.29 |
| 2004/0125494 A1 * | 7/2004 | Hara et al. | 360/75 |
| 2004/0160865 A1 * | 8/2004 | Storz | 369/44.32 |
| 2004/0190397 A1 * | 9/2004 | Kuwahara et al. | 369/44.11 |
| 2004/0246618 A1 * | 12/2004 | Ehrlich | 360/77.02 |
| 2004/0246833 A1 * | 12/2004 | Ehrlich | 369/44.29 |
| 2008/0042602 A1 | 2/2008 | Kumar | |
| 2010/0195243 A1 | 8/2010 | Zhu et al. | |
| 2011/0235206 A1 * | 9/2011 | Chung | 360/71 |

* cited by examiner

Primary Examiner — Thomas Alunkal

(57) ABSTRACT

A disk drive is disclosed comprising a head actuated over a disk, a spindle motor operable to rotate the disk, and control circuitry comprising a speed control loop operable to control a rotation speed of the disk. A rotation speed of the disk is measured, and a speed error is generated in response to the measured rotation speed. The speed error is processed with a compensator to generate a control signal, a disturbance is injected into the control signal to generate a modified control signal, and the modified control signal is applied to the spindle motor. An amplitude of the disturbance is ramped, and after ramping the amplitude of the disturbance, an open-loop gain of the speed control loop is estimated at a frequency of the disturbance, and at least one parameter of the compensator is adjusted in response to the estimated open-loop gain.

18 Claims, 4 Drawing Sheets

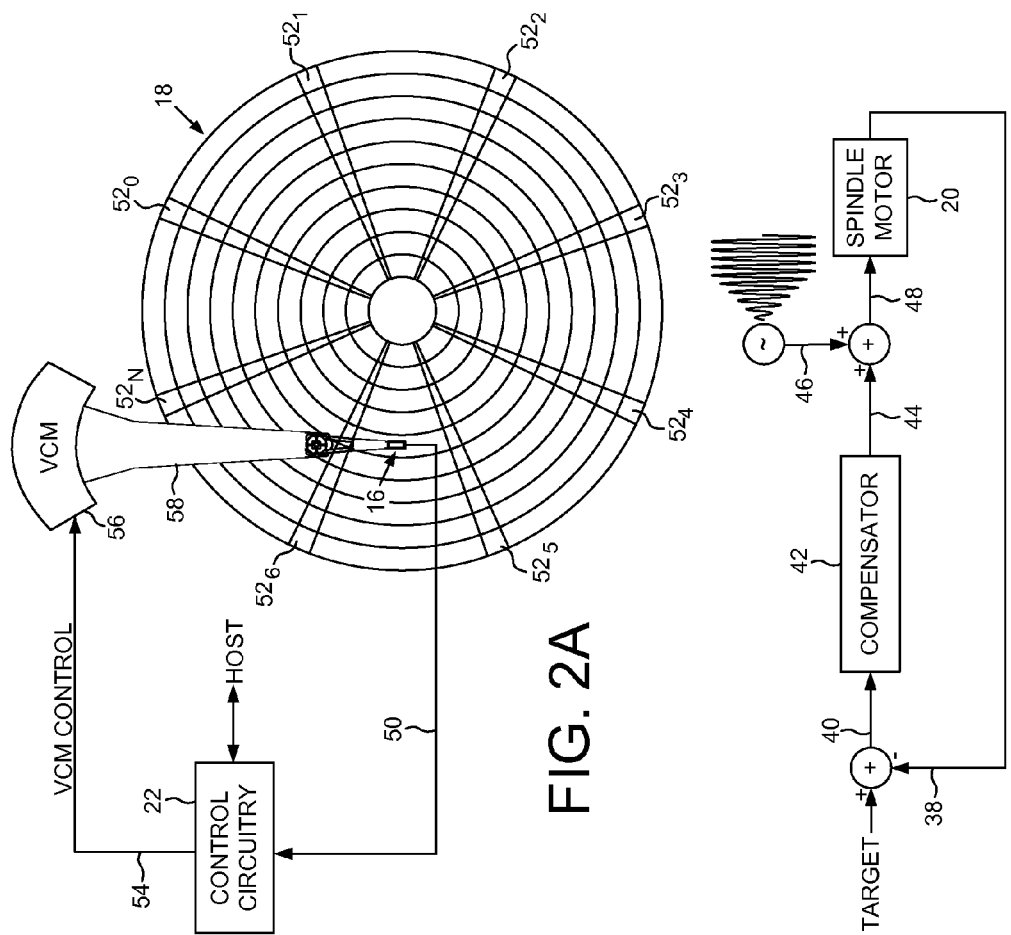
FIG. 2A
FIG. 2B
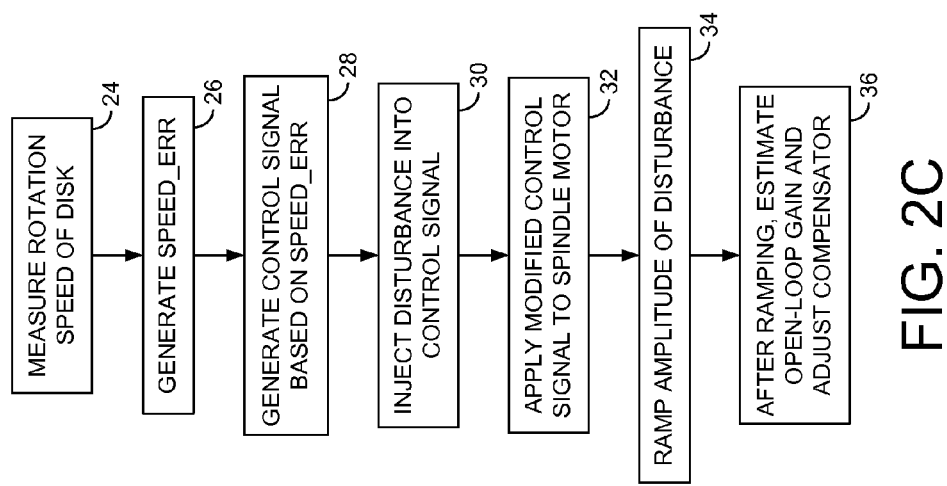
FIG. 2C

US 8,649,121 B1

DISK DRIVE TUNING SPEED CONTROL LOOP FOR A SPINDLE MOTOR

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

A spindle motor typically in the form of a brushless DC motor spins the disk during normal access operations. The speed of the spindle motor is maintained using a speed control loop which measures a speed error, and then filters the speed error with a suitable compensator (e.g., a proportional-integral (PI) compensator). The ability of the speed control loop to maintain the disk at the target speed typically depends on the performance characteristics of the spindle motor, as well as the parameter settings of the compensator (e.g., the gain setting which affects the bandwidth of the speed control loop).

BRIEF DESCRIPTION OF THE DRAWINGS

FIG. 2A shows a disk drive according to an embodiment of the present invention comprising a head actuated over a disk.

FIG. 2B shows a speed control loop for controlling a rotation speed of the disk according to an embodiment of the present invention.

FIG. 2C is a flow diagram according to an embodiment of the present invention wherein an amplitude of a disturbance injected into the speed control loop is ramped, and then an open-loop gain of the speed control loop is estimated at a frequency of the disturbance in order to adjust a parameter of a compensator.

DETAILED DESCRIPTION

Figure 1:
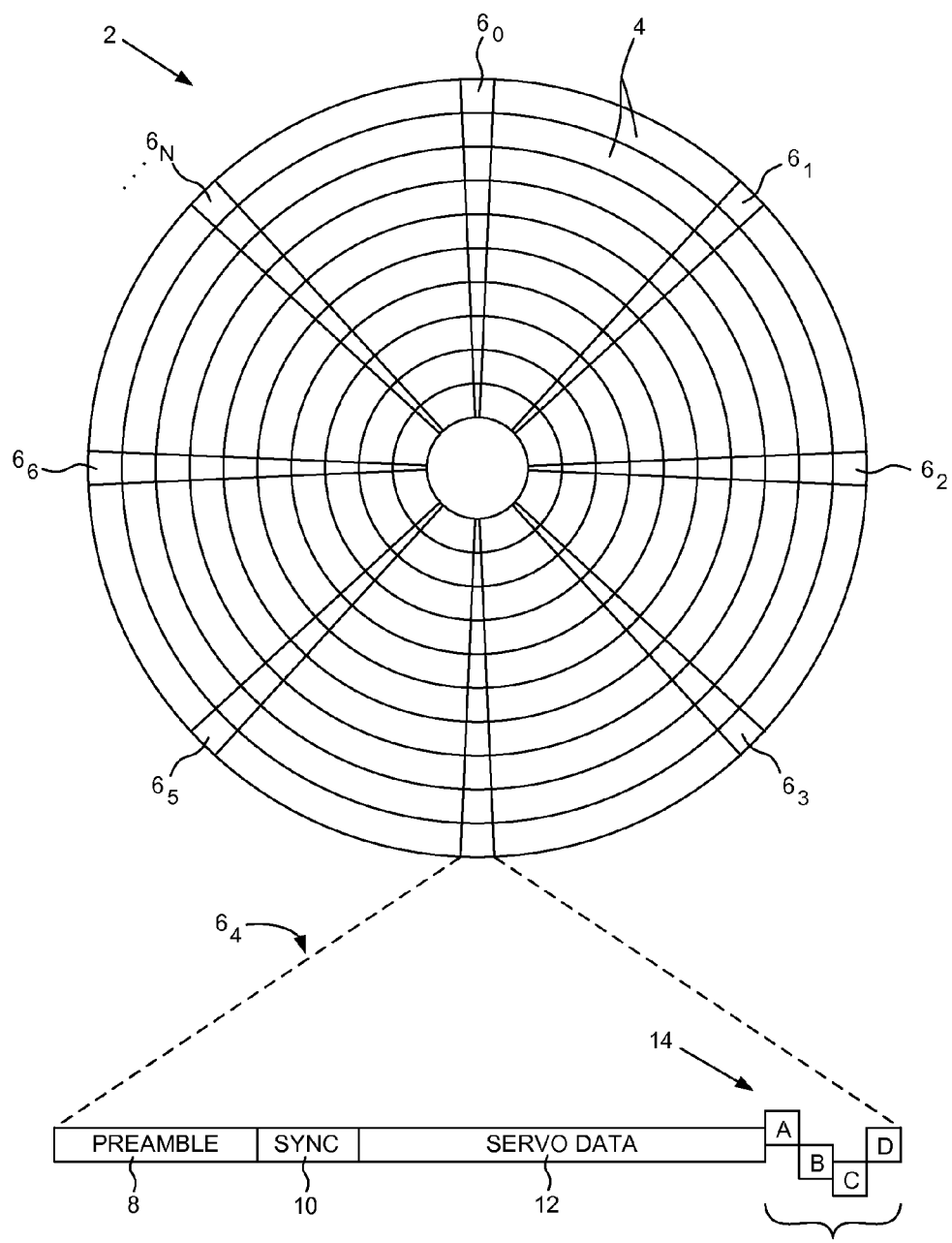
FIG. 1 shows a prior art disk format comprising a plurality of servo tracks defined by embedded servo sectors.

FIGS. 2A and 2B show a disk drive according to an embodiment of the present invention comprising a head 16 actuated over a disk 18, a spindle motor 20 operable to rotate the disk 18, and control circuitry 22 comprising a speed control loop operable to control a rotation speed of the disk 18. The control circuitry 22 is operable to execute the flow diagram of FIG. 2C, wherein a rotation speed 38 of the disk is measured (block 24), and a speed error 40 is generated in response to the measured rotation speed (block 26). The speed error 40 is processed with a compensator 42 to generate a control signal 44 (block 28), a disturbance 46 is injected into the control signal 44 to generate a modified control signal 48 (block 30), and the modified control signal 48 is applied to the spindle motor 20 (block 32). An amplitude of the disturbance 46 is ramped (block 34), and after ramping the amplitude of the disturbance 46, an open-loop gain of the speed control loop is estimated at a frequency of the disturbance 46, and at least one parameter of the compensator 42 is adjusted in response to the estimated open-loop gain (block 36).

In the embodiment of FIG. 2A, the control circuitry 22 processes a read signal 50 emanating from the head 16 to demodulate servo sectors $52_0$-$52_N$ on the disk 18 and generate a position error signal (PES) representing an error between the actual position of the head and a target position relative to a target track. The control circuitry 22 filters the PES using suitable compensation filters to generate a control signal 54 applied to a voice coil motor (VCM) 56 which rotates an actuator arm 58 about a pivot, thereby actuating the head 16 radially over the disk 18 in a direction that reduces the PES. The actual position of the head is measured by reading position information derived from the servo sectors $52_0$-$52_N$, such as a track address for coarse positioning and servo bursts for fine positioning. The servo bursts may comprise any suitable pattern, such as an amplitude based servo pattern as shown in FIG. 1, or a suitable phase based servo pattern.

Figure 3:
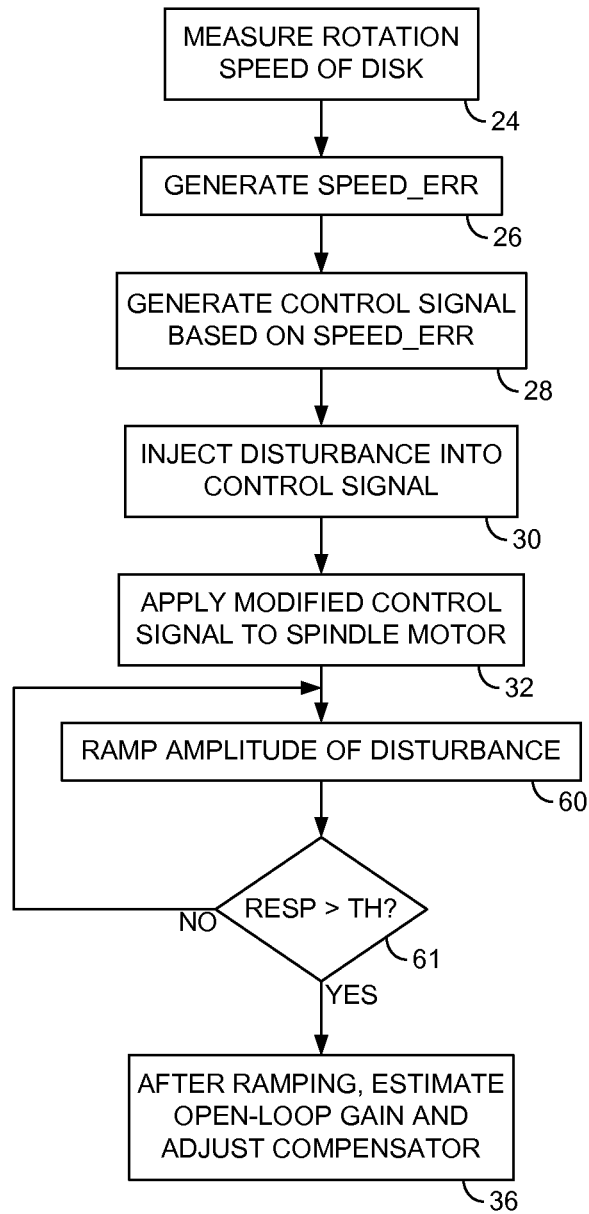
FIG. 3 is a flow diagram according to an embodiment of the present invention wherein the disturbance is ramped until a response of the speed control loop exceeds a threshold.

Adjusting at least one parameter of the spindle motor compensator 42 in response to the estimated open-loop gain helps optimize performance of the speed control loop and thereby help maintain the target rotational speed of the disk during normal operation. Injecting a disturbance 46 into the control signal 44 of the speed control loop enables the control circuitry 22 to estimate the open-loop gain at the frequency of the disturbance 46. In an embodiment of the present invention, the control circuitry 22 first optimizes the amplitude of the disturbance 46 prior to injecting the disturbance 46 into the speed control loop. This is illustrated in the flow diagram of FIG. 3 which is an extension of the flow diagram of FIG. 2C, wherein the amplitude of the disturbance is ramped (block 60) as shown in FIG. 2B, until a response of the speed control loop exceeds a threshold (block 61). Any suitable response of the speed control loop may be evaluated at block 61, wherein in one embodiment the response comprises the speed error 40 of the speed control loop. After the amplitude of the disturbance 46 reaches the threshold, the amplitude of the disturbance 46 is maintained at a constant level (as shown in FIG. 2B) while measuring the open-loop gain of the speed control loop (block 36).

Any suitable parameter of the compensator 42 may be adjusted at block 36 of FIG. 2C, and in one embodiment a gain of the compensator 42 is adjusted. This embodiment is illustrated in the flow diagram of FIG. 4 wherein the gain of the compensator 42 is first initialized to a suitable nominal value (block 62). In one embodiment, the gain of the compensator 42 is initialized according to:

$$K_p = \frac{\omega_{olbw}}{K_d K_t} \sqrt{\frac{(\omega_{olbw} J_{spindle} R_w)^2 + (K_t K_e)^2}{\omega_{olbw}^2 + K_i^2}}$$

where:
$K_p$ represents the gain of the compensator;
$\omega_{olbw}$ is a desired bandwidth frequency of the speed control loop;
$K_d$ is a gain of a spindle motor driver operable to drive the spindle motor;
$K_t$ represents a motor torque constant of the spindle motor;
$K_e$ represents a back electromotive force constant of the spindle motor;
$J_{spindle}$ represents a total rotational inertia of the spindle motor;
$R_w$ represents a winding resistance of the spindle motor; and
$K_i$ represents a ratio of an integral gain to a proportional gain of the compensator.

After initializing the gain of the compensator 42 (block 62), the disk 18 is spun-up to a target speed (block 64), and the amplitude of the disturbance 46 is ramped until an optimal amplitude is determined (block 66). The disturbance 46 is injected into the control signal 44 of the speed control loop (block 68), and the open-loop gain of the speed control loop is estimated at a frequency of the disturbance 46 (block 70). If the estimated open-loop gain of the speed control loop does not substantially match a target (block 72), and a maximum number of retries has not been reached (block 74), then the gain of the compensator 42 is adjusted (block 76) and the flow diagram is repeated from block 68. When the open-loop gain of the speed control loop substantially matches the target (block 72), then the compensator 42 is configured with the adjusted gain (block 78). If the maximum number of retries is reached (block 74), then the compensator 42 is configured with a default gain (block 80). In one embodiment, the default gain used to configure the compensator 42 at block 80 is the nominal gain configured at block 62 described above.

The open-loop gain of the speed control loop may be estimated at the frequency of the disturbance 46 using any suitable technique. In one embodiment, the open-loop gain may be estimated according to:

$$\left| \frac{DFT[\text{CTRL\_SIG}]}{DFT[\text{CTRL\_SIG}] + DFT[\text{DISTURBANCE}]} \right|$$

where CTL_SIG is the control signal 44, DISTURBANCE is the disturbance 46 injected into the control signal 44, and DFT is a Discrete Fourier Transform.

Figure 4:
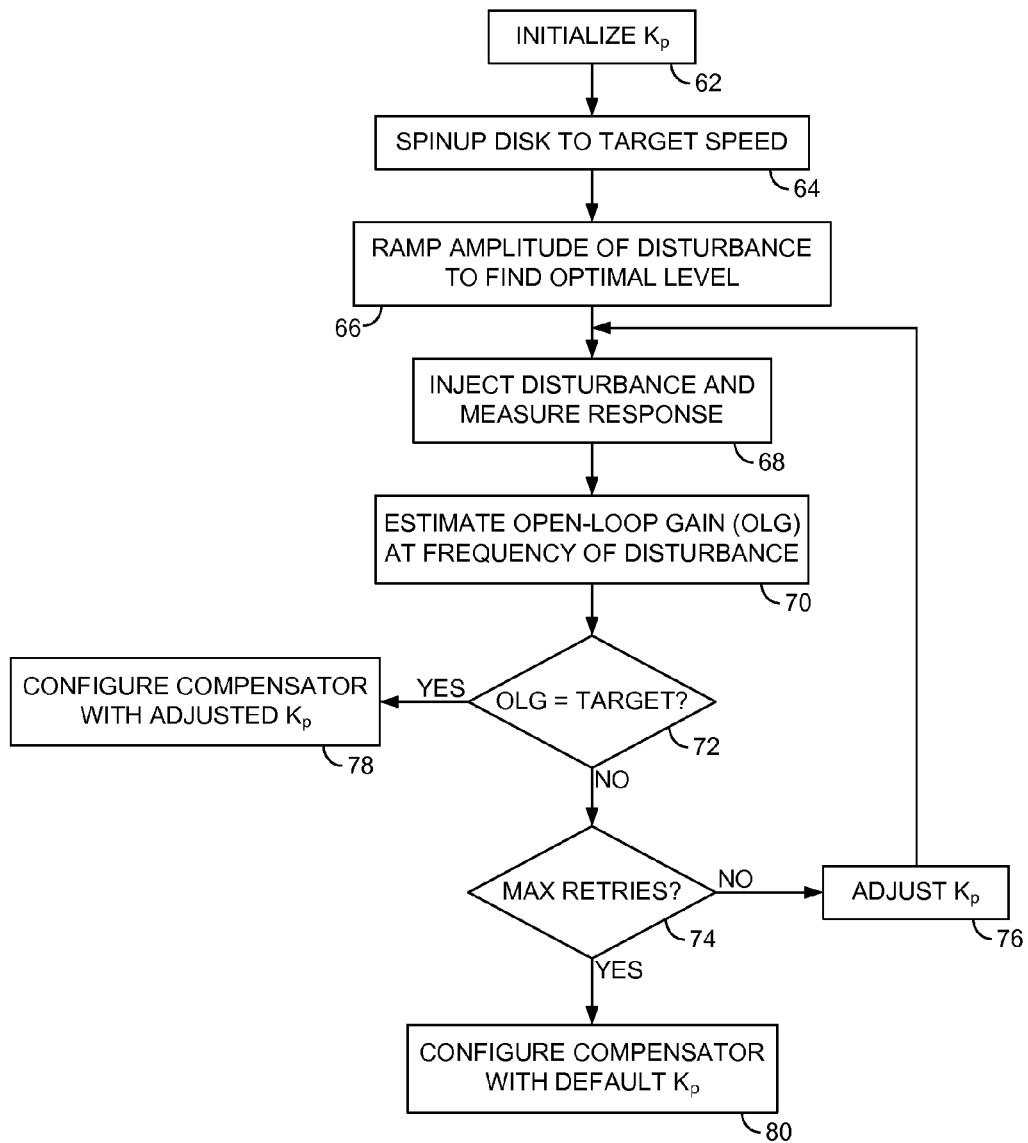
FIG. 4 is a flow diagram according to an embodiment of the present invention wherein a gain of the compensator is adjusted in response to the estimated open-loop gain of the speed control loop.

The gain of the compensator 42 may be adjusted at block 76 of FIG. 4 using any suitable technique. In one embodiment, the gain of the compensator 42 may be adjusted according to:

$$K_p[i+1] = \frac{K_p[i]}{OLG_i}$$

where:
$K_p$ represents the gain of the compensator; and
$OLG_i$ represents the estimated open-loop gain of the speed control loop at the frequency of the disturbance corresponding to $K_p[i]$.
In another embodiment, the gain of the compensator 42 may be adjusted according to:

$$K_p[i+1] = K_p[i] \times (1 - \alpha) + \frac{K_p[i]}{OLG_i} \times \alpha$$

where:
$K_p$ represents the gain of the compensator;
$OLG_i$ represents the estimated open-loop gain of the speed control loop at the frequency of the disturbance corresponding to $K_p[i]$; and
$\alpha$ is a positive scalar less than one.

Other embodiments may use a different algorithm to adjust the gain of the compensator 42 at block 76, such as a suitable search algorithm (e.g., a binary search, a golden section search, etc.).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:
1. A disk drive comprising:
  a disk;
  a head actuated over the disk;
  a spindle motor operable to rotate the disk; and
  control circuitry comprising a speed control loop operable to:
    measure a rotation speed of the disk;
    generate a speed error in response to the measured rotation speed;
    process the speed error with a compensator to generate a control signal;
    inject a disturbance into the control signal to generate a modified control signal; and
    apply the modified control signal to the spindle motor;
  wherein the control circuitry is operable to:
    ramp an amplitude of the disturbance while injecting the disturbance into the control signal; and
    after ramping the amplitude of the disturbance, estimate an open-loop gain of the speed control loop at a frequency of the disturbance and adjust at least one parameter of the compensator in response to the estimated open-loop gain.

2. The disk drive as recited in claim 1, wherein the control circuitry is operable to ramp the amplitude of the disturbance until the speed control loop generates a response that exceeds a threshold.

3. The disk drive as recited in claim 1, wherein the control circuitry is further operable to adjust a gain of the compensator in response to the estimated open-loop gain.

4. The disk drive as recited in claim 3, wherein the control circuitry is operable to adjust the gain of the compensator according to:

$$K_p[i+1] = \frac{K_p[i]}{OLG_i}$$

where:

$K_p$ represents the gain of the compensator; and
$OLG_i$ represents the estimated open-loop gain of the speed control loop at the frequency of the disturbance corresponding to $K_p[i]$.

5. The disk drive as recited in claim 3, wherein the control circuitry is operable to adjust the gain of the compensator according to:

$$K_p[i+1] = K_p[i] \times (1-\alpha) + \frac{K_p[i]}{OLG_i} \times \alpha$$

where:

$K_p$ represents the gain of the compensator;
$OLG_i$ represents the estimated open-loop gain of the speed control loop at the frequency of the disturbance corresponding to $K_p[i]$; and
$\alpha$ is a positive scalar less than one.

6. The disk drive as recited in claim 3, wherein prior to ramping the amplitude of the disturbance, the control circuitry is further operable to initialize the gain of the compensator according to:

$$K_p = \frac{\omega_{olbw}}{K_d K_t} \sqrt{\frac{(\omega_{olbw} J_{spindle} R_w)^2 + (K_t K_e)^2}{\omega_{olbw}^2 + K_i^2}}$$

where:

$K_p$ represents the gain of the compensator;
$\omega_{olbw}$ is a desired bandwidth frequency of the speed control loop;
$K_d$ is a gain of a spindle motor driver operable to drive the spindle motor;
$K_t$ represents a motor torque constant of the spindle motor;
$K_e$ represents a back electromotive force constant of the spindle motor;
$J_{spindle}$ represents a total rotational inertia of the spindle motor;
$R_w$ represents a winding resistance of the spindle motor; and
$K_i$ represents a ratio of an integral gain to a proportional gain of the compensator.

7. The disk drive as recited in claim 3, wherein the control circuitry is further operable to adjust the gain of the compensator until the open-loop gain of the speed control loop substantially matches a target value.

8. The disk drive as recited in claim 7, wherein the control circuitry is further operable to configure the gain with a default value when the open-loop gain of the speed control loop does not converge to the target value.

9. The disk drive as recited in claim 8, wherein the default value comprises:

$$K_p = \frac{\omega_{olbw}}{K_d K_t} \sqrt{\frac{(\omega_{olbw} J_{spindle} R_w)^2 + (K_t K_e)^2}{\omega_{olbw}^2 + K_i^2}}$$

where:

$K_p$ represents the gain of the compensator;
$\omega_{olbw}$ is a desired bandwidth frequency of the speed control loop;
$K_d$ is a gain of a spindle motor driver operable to drive the spindle motor;
$K_t$ represents a motor torque constant of the spindle motor;
$K_e$ represents a back electromotive force constant of the spindle motor;
$J_{spindle}$ represents a total rotational inertia of the spindle motor;
$R_w$ represents a winding resistance of the spindle motor; and
$K_i$ represents a ratio of an integral gain to a proportional gain of the compensator.

10. A method of operating a disk drive, the disk drive comprising a head actuated over a disk, a spindle motor operable to rotate the disk, and control circuitry comprising a speed control loop operable to control a rotation speed of the disk, the method comprising:
measuring a rotation speed of the disk;
generating a speed error in response to the measured rotation speed;
processing the speed error with a compensator to generate a control signal;
injecting a disturbance into the control signal to generate a modified control signal; and
applying the modified control signal to the spindle motor;
ramping an amplitude of the disturbance while injecting the disturbance into the control signal; and
after ramping the amplitude of the disturbance, estimating an open-loop gain of the speed control loop at a frequency of the disturbance and adjusting at least one parameter of the compensator in response to the estimated open-loop gain.

11. The method as recited in claim 10, wherein the amplitude of the disturbance is ramped until the speed control loop generates a response that exceeds a threshold.

12. The method as recited in claim 10, further comprising adjusting a gain of the compensator in response to the estimated open-loop gain.

13. The method as recited in claim 12, wherein the gain of the compensator is adjusted according to:

$$K_p[i+1] = \frac{K_p[i]}{OLG_i}$$

where:

$K_p$ represents the gain of the compensator; and
$OLG_i$ represents the estimated open-loop gain of the speed control loop at the frequency of the disturbance corresponding to $K_p[i]$.

14. The method as recited in claim 12, wherein the gain of the compensator is adjusted according to:

$$K_p[i+1] = K_p[i] \times (1-\alpha) + \frac{K_p[i]}{OLG_i} \times \alpha$$

where:

$K_p$ represents the gain of the compensator;

$OLG_i$ represents the estimated open-loop gain of the speed control loop at the frequency of the disturbance corresponding to $K_p[i]$; and $\alpha$ is a positive scalar less than one.

15. The method as recited in claim 12, wherein prior to ramping the amplitude of the disturbance, further comprising initializing the gain of the compensator according to:

$$K_p = \frac{\omega_{olbw}}{K_d K_t} \sqrt{\frac{(\omega_{olbw} J_{spindle} R_w)^2 + (K_t K_e)^2}{\omega_{olbw}^2 + K_i^2}}$$

where:

$K_p$ represents the gain of the compensator;

$\omega_{olbw}$ is a desired bandwidth frequency of the speed control loop;

$K_d$ is a gain of a spindle motor driver operable to drive the spindle motor;

$K_t$ represents a motor torque constant of the spindle motor;

$K_e$ represents a back electromotive force constant of the spindle motor;

$J_{spindle}$ represents a total rotational inertia of the spindle motor;

$R_w$ represents a winding resistance of the spindle motor; and $K_i$ represents a ratio of an integral gain to a proportional gain of the compensator.

16. The method as recited in claim 12, wherein the gain of the compensator is adjusted until the open-loop gain of the speed control loop substantially matches a target value.

17. The method as recited in claim 16, further comprising configuring the gain with a default value when the open-loop gain of the speed control loop does not converge to the target value.

18. The method as recited in claim 17, wherein the default value comprises:

$$K_p = \frac{\omega_{olbw}}{K_d K_t} \sqrt{\frac{(\omega_{olbw} J_{spindle} R_w)^2 + (K_t K_e)^2}{\omega_{olbw}^2 + K_i^2}}$$

where:

$K_p$ represents the gain of the compensator;

$\omega_{olbw}$ is a desired bandwidth frequency of the speed control loop;

$K_d$ is a gain of a spindle motor driver operable to drive the spindle motor;

$K_t$ represents a motor torque constant of the spindle motor;

$K_e$ represents a back electromotive force constant of the spindle motor;

$J_{spindle}$ represents a total rotational inertia of the spindle motor;

$R_w$ represents a winding resistance of the spindle motor; and $K_i$ represents a ratio of an integral gain to a proportional gain of the compensator.

\* \* \* \* \*